United States Patent [19]

Kuriyama

[11] Patent Number: 5,285,200
[45] Date of Patent: Feb. 8, 1994

[54] PORTABLE ELECTRONIC DEVICE AND A METHOD FOR PROCESSING DATA THEREFORE

[75] Inventor: Ryouichi Kuriyama, Yokosuka, Japan

[73] Assignee: Kabushiki Kaisha Toshiba, Kawasaki, Japan

[21] Appl. No.: 5,190

[22] Filed: Jan. 14, 1993

Related U.S. Application Data

[63] Continuation of Ser. No. 798,174, Nov. 26, 1991, abandoned.

[30] Foreign Application Priority Data

Nov. 29, 1990 [JP] Japan ................... 2-325263

[51] Int. Cl.$^5$ .............................................. H04B 1/00
[52] U.S. Cl. ............................. 340/825.34; 235/380; 235/382
[58] Field of Search ................... 340/825.3–825.34; 235/380, 381, 382, 382.5

[56] References Cited

U.S. PATENT DOCUMENTS

| | | |
|---|---|---|
| 4,847,803 | 7/1989 | Miyano .......................... 340/825.34 |
| 4,910,470 | 3/1990 | Barakat . |
| 4,988,855 | 1/1991 | Iijima . |
| 5,010,237 | 4/1991 | Kawana . |
| 5,034,597 | 7/1991 | Atsumi et al. . |

FOREIGN PATENT DOCUMENTS 2503423 10/1982 France .

Primary Examiner—Donald J. Yusko
Assistant Examiner—Michael Horabik
Attorney, Agent, or Firm—Cushman, Darby & Cushman

[57] ABSTRACT

A portable electronic device contains a memory having first to third memory areas and a CPU. A plurality of identification number data is stored in the first memory area. The portable electronic device receives identification number data from an external device. The CPU verifies the identification number data received by this device with the identification number data stored in the first memory area. Verification results are then stored in the second memory area. The portable electronic device also receives instruction data from the external device. Control data corresponding to the instruction data and representing a plurality of identifiers are stored in the third memory area. Each identifier indicates whether or not identification number verification is required and whether complete or partial identification number verification is required. The CPU then refers to the verification results stored in the second memory area in accordance with the control data stored in the third memory area after the instruction data has been received. Finally, the CPU executes the instruction data in response to the verification results.

7 Claims, 6 Drawing Sheets

FUNCTION CODE
FUNCTIONAL PROGRAM LEAD ADDRESS
CONTROL INFORMATION

A01 →

| A | aaa | a1 |
| B | bbb | b1 |
| C | ccc | c1 |
| N | nnn | n1 |

| W | a | Y3 | Y2 | Y1 | Y0 |

| X0 |
| X1 |
| X2 |
| X3 |

| Z3 | Z2 | Z1 | Z0 |

*Fig. 8.*

PORTABLE ELECTRONIC DEVICE AND A METHOD FOR PROCESSING DATA THEREFORE

This is a continuation of application Ser. No. 07/798,174, filed on Nov. 26, 1991, which was abandoned upon the filing hereof.

BACKGROUND OF THE INVENTION

1. Field of the Invention

The present invention relates to a portable electronic device such as an IC card and a method for processing data therefor.

2. Description of the Related Art

Recently, IC cards have been developed as new portable data memory media. A card normally contains IC chips having, for example control elements such as, non-volatile data memories and CPUs. This type of IC card selectively executes the input and output of required data by the control element accessing the data memory in response to instruction data inputted from outside. In the current invention, the data memory is divided into a plurality of data areas, and is designed to selectively access the subject area.

In a prior art IC card, whether or not verification of an ID (identification) number is required for each of the plurality of data areas is set for the data memory data area within the data area. Thus, a key is applied for setting the ID number verification state for the card-manufacturer, the card-issuer and the card-holder. For example, in the case of a relevant data area being only available for the card-issuer, if the card-issuer's ID number is verified and instruction data is inputted, processing of that instruction data is executed. However, when instruction data is inputted by anyone other than the card-issuer, response data to the effect that execution conditions are not in order is outputted externally, and processing of the instruction data is not executed. That is, if instruction data is inputted by the card holder, for instance, response data to the effect that execution conditions are not in order is outputted externally. Under these conditions, it is possible for a card-holder to guess the instruction data which would be executed if inputted by the card-manufacturer or card-issuer. Thus, if the card-holder is aware of the card-issure's or card-manufacturer's ID number, there is a danger that the execution of the instruction data will be performed. This can occur if the card-holder inputs instruction data based on the card-issuer's or card-manufacturer's ID number.

When instruction data which is undefined or not available is inputted by, for instance, the card-holder, response data signifying 'undefined instruction data' is outputted externally. It is possible for the card-holder to guess that only instruction data excepting the ID number is undefined. Thus, there is danger of that defined or available instruction data can be guessed by the card-holder based on any instruction data which is inputted by the card-holder.

Thus, there is the possibility that the available instruction data will become identified, and therefore, there is a problem of poor security.

SUMMARY OF THE INVENTION

It is an object of the present invention to provide a portable electronic device in which security is improved by preventing the available instruction data from becoming easily identified.

It is another object of the present invention to provide a method for processing data for a portable electronic device in which security is improved by preventing the available instruction data from becoming easily identified.

Accordingly, the present invention provides a portable electronic device. The device includes a first memory means for storing a plurality of identification number data. Means are provided for receiving a plurality of instruction data including an identification number verifying instruction data from an external device. Means for verifying the identification number data received by the receiving means with the identification number data stored in the first memory means. Verification is performed when the receiving means receives the identification number data and the identification number verifying instruction data. Second memory means are provided for storing verification results. Third memory means are provided for storing control data corresponding to the instruction data and representing a plurality of identifiers. Each identifier indicates whether identification number verification is required and whether complete or partial identification number verifications is required. Means are provided for referring to the verification results stored in the second memory means in accordance with the control data stored in the third memory means after the instruction data excepting the identification number verifying instruction data has been received by the receiving means. Means are also provided for executing the instruction data in response to the verification results.

Furthermore, the present invention pertains to a method for processing data by a portable electronic device with a memory having first to third memory areas. The method comprises the steps of: storing a plurality of identification number data in the first area of the memory; receiving identification number data from an external device; verifying the identification number data received with the identification number data stored in the first memory area; storing verification results in the second memory area; receiving instruction data from an external device; storing, in the third memory area, control data corresponding to the instruction data and representing a plurality of identifiers which indicate whether identification number verification is required and whether complete or partial identification number verifications is required; referring to the verification results stored in the second memory area in accordance with the control data stored in the third memory area after the instruction data has been received; and executing the instruction data in response to the verification results.

BRIEF DESCRIPTION OF THE DRAWINGS

FIG. 5 is a memory map showing how lead addresses and control information for functional programs stored correspond to function codes;

FIG. 6 is a diagram showing the control data;

FIG. 7 is a schematic diagram showing the identification numbers data;

FIG. 8 is a diagram showing data representing the result of ID collation;

DETAILED DESCRIPTION OF THE PREFERRED EMBODIMENT

A preferred embodiment of the present invention will now be described, with reference to the accompanying drawings.

Figure 1:
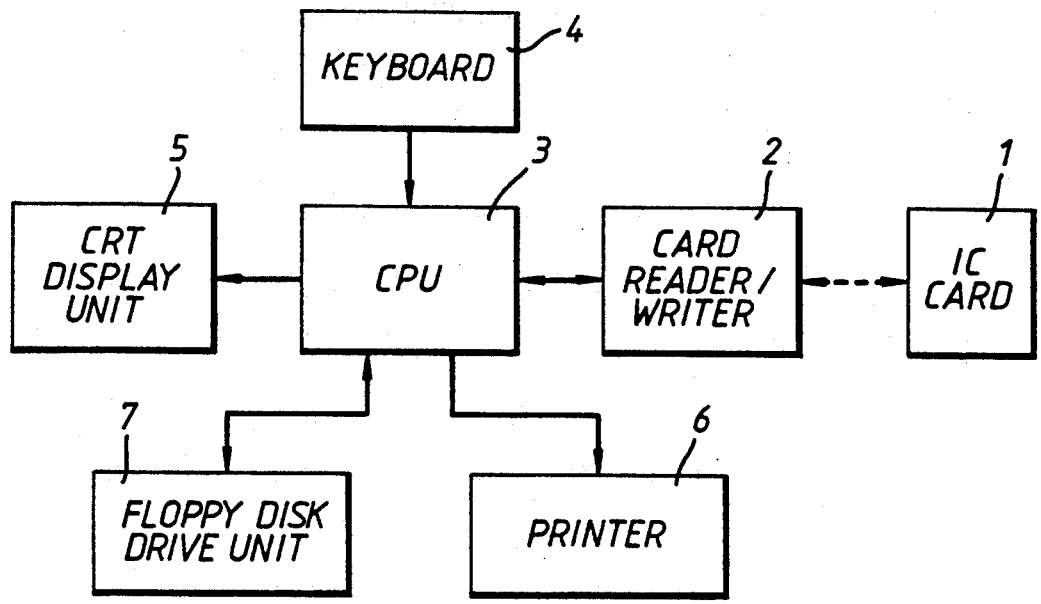
FIG. 1 is a schematic block diagram showing the construction of an IC card handling system to be applied to a method for processing data for a portable electronic device of the present invention.

FIG. 1 shows a block diagram of a card handling system in which an IC card is applied as the portable electronic device. The system is constructed by making IC card 1 connectable to CPU 3 which functions as a control section via card reader/writer 2. Keyboard 4, CRT display unit 5, printer 6 and floppy disk drive unit 7 are connected to CPU 3.

Figure 2:
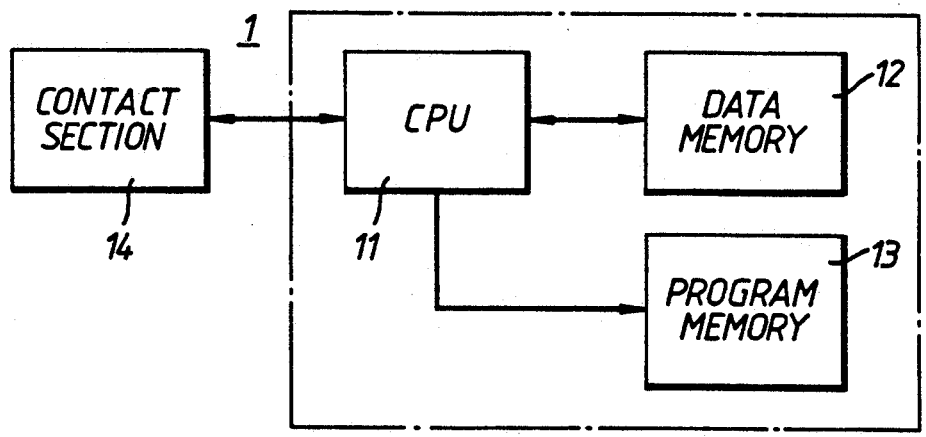
FIG. 2 is a block diagram schematically illustrating the composition of an IC card of the present invention.
Figure 3:
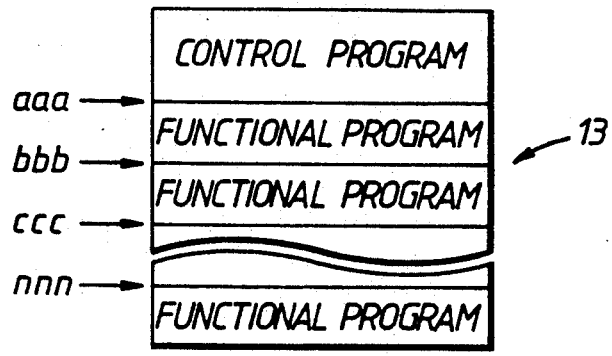
FIG. 3 is a schematic diagram showing the structure of the program memory in the IC card of FIG. 2.

FIG. 2 shows a block diagram of IC card 1. IC card 1 is comprised of: CPU 11, referred to as a control element; non-volatile data memory 12, in which the memory content is erasable, referred to as the data memory unit; program memory 13, referred to as the program memory unit, and contact unit 14 which enables electrical contact with card reader/writer 2. Of these, the parts within the pecked line (i.e. CPU 11, data memory 12 and program memory 13) are contained in one IC chip which is buried in the main body of the IC card. Program memory 13 can be comprised of a mask ROM for example. As shown in FIG. 3, program memory 13 stores the control program for CPU 11, the control program provides functional programs which respond to a plurality of instruction data. Data memory 12 is used for storing various types of data, and can be comprised of an EEPROM, for example.

Figure 4:
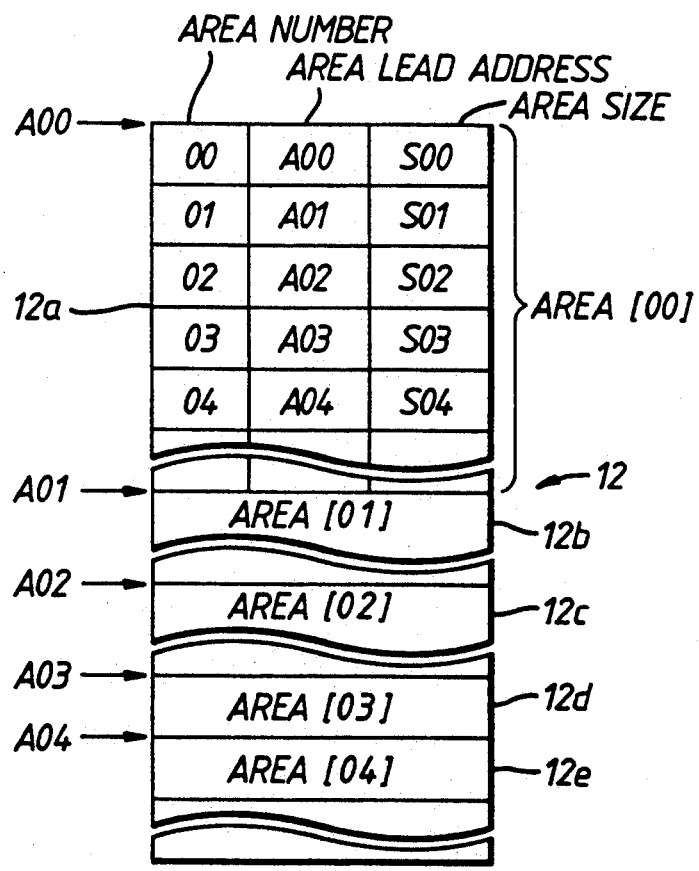
FIG. 4 is a schematic diagram showing the composition of the data memory in the IC card of FIG. 2.

As shown in FIG. 4, data memory 12 is divided into a plurality of areas and each area is given an area number [00, 01, 02, . . . ]. In AREA [00] 12a, the respective area lead addresses and area sizes (the numbers of bytes which comprises the areas) are stored corresponding to their respective area numbers. For example, this operates in such a way that lead address A03 and area size S03 bytes correspond to AREA [03] 12d. Furthermore, as shown in FIG. 5, the lead address and control data of each functional program is stored corresponding to a function code within AREA [01] 12b. In other words, this operates in such a way that the lead address of the program which executes function code [B] is bbb, and the corresponding control data is b1, as shown in FIG. 5. Moreover, as shown in FIG. 7, a plurality of identification (hereinafter referred to as ID) number data X0-X3 is stored in AREA [02] 12c. The ID number data X0-X3 is used for verification of ID numbers. For example, the ID number data for the card-manufacturer, the card-issuer, the card-holder, etc. can be stored in AREA [02] 12c. AREA [03] 12d, AREA [04] 12e and succeeding areas are data areas.

FIG. 6 shows the control data, which is stored in memory area 12bb of AREA [01] 12b, mentioned above. The control data comprised of identifiers Y0-Y3, W and α. Identifier Y0-Y3 correspond to the ID number data X0-X3, mentioned above, and indicate whether or not verification of the ID number data is required. For example "1" represents 'verification required' and "0" represents 'verification not required'. Thus, if identifier Y0 is "1", verification of ID number data by ID number data X0 is required. Identifier W represents whether checking of identifiers Y0-Y3 is required. For instance "1" represents 'checking required' and "0" represents 'checking not required'.

In the combination of identifiers Y0-Y3, identifier α determines whether all of the ID number verifications or only part of the ID number verifications is required. For example, "1" represents 'all ID number verifications are required' and "0" represents 'only part of the ID number verifications is required'.

FIG. 8 shows the information which represent the result of the verification of ID numbers, and is comprised of identifiers Z0-Z3. Identifiers Z0-Z3 correspond to respective ID number data X0-X3, and represent the verification results of this data. For example, "1" represents 'verification agreed' and "0" represents 'verification disagreed'. Thus, if identifier Z0 is "1", this represents that the result of ID number verification by ID number data X0 is 'verification agreed'. Furthermore, this data (identifiers Z0-Z3), is stored in memory area 11a in the RAM which is housed in CPU 11. However, this data may be stored in other memory elements, such as data memory 12.

Figure 9:
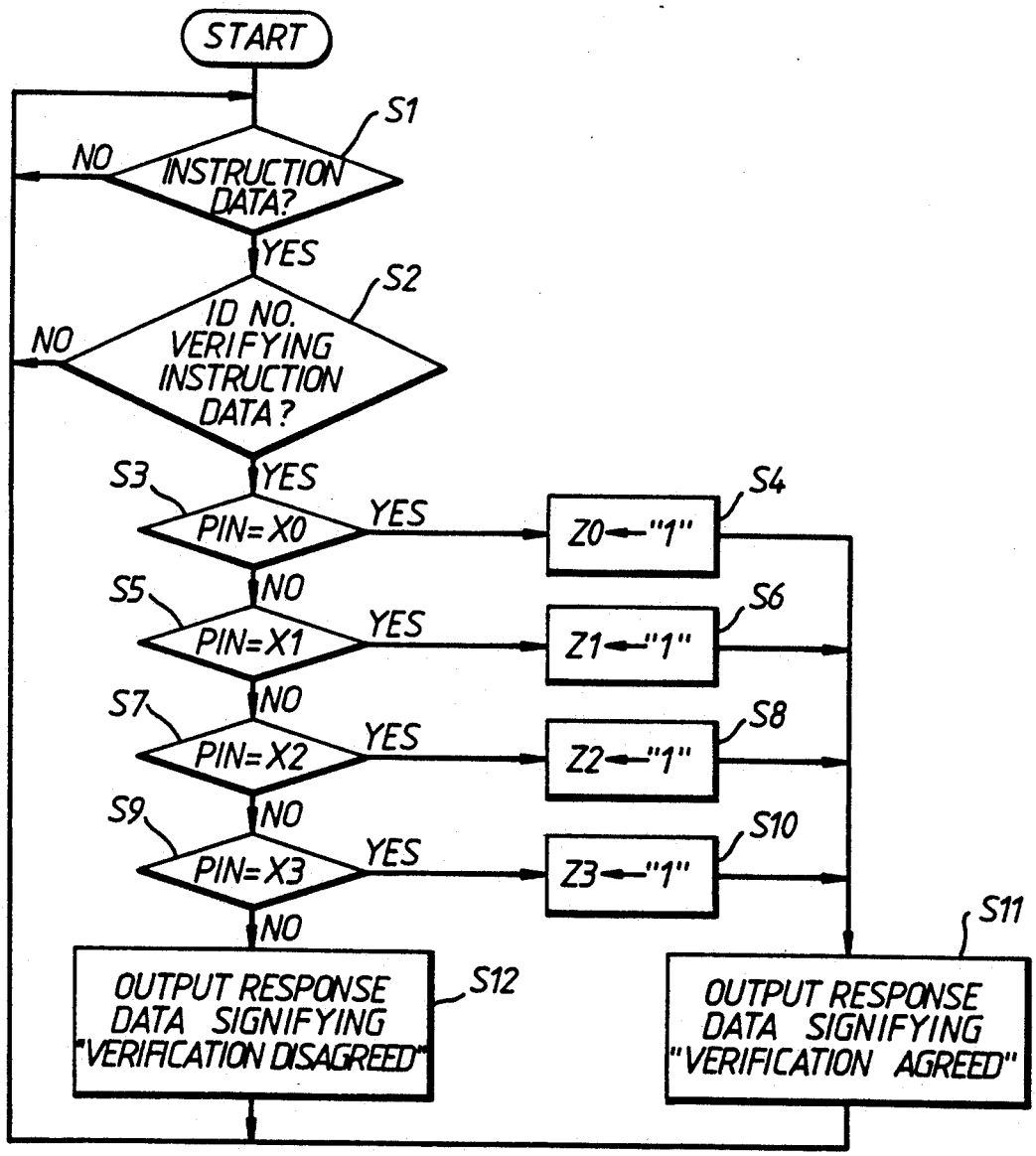
FIG. 9 is a flow-chart illustrating the ID verifying operation.

The way in which the IC card described above operates will now be explained. The ID number verification operation is described by reference to the flow-chart shown in FIG. 9. In the regular state, IC card 1 is in the ready state for instruction data from card reader/writer 2. In this state, when instruction data from card reader/writer 2 is inputted (step S1), CPU 11 determines whether or not this is an ID number verifying instruction data (step S2). If it is ID number verifying instruction data, the ID number data to be verified (shown as PIN (Personal Identification Number) in the flow-chart) is sequentially compared with each ID number data X0-X3 stored in area [02] of data memory 12 (steps S3, S5, S7 and S9). If there is an ID number data which agrees as the result of this verification, CPU 11 sets the identifier (Z0-Z3) in the RAM which corresponds to the ID number data to "1" (steps S4, S6, S8 and S10). For example, if PIN agrees with ID number data X0, identifier Z0 is set to "1" (step S4), and if PIN agrees with ID number data X3, identifier Z3 is set to "1" (step S10). Then, CPU 11 outputs the response data signifying 'verification agreed' to card reader/writer 2 (step S11). CPU 11 then returns to the ready for instruction data state. If, as the result of the above verification, there is no agreement with any of ID number data X0-X3, CPU 11 outputs the response data signifying 'verification disagreed' to card reader/writer 2 (step S12). CPU 11 then returns to the ready for instruction data state.

Figure 10A:
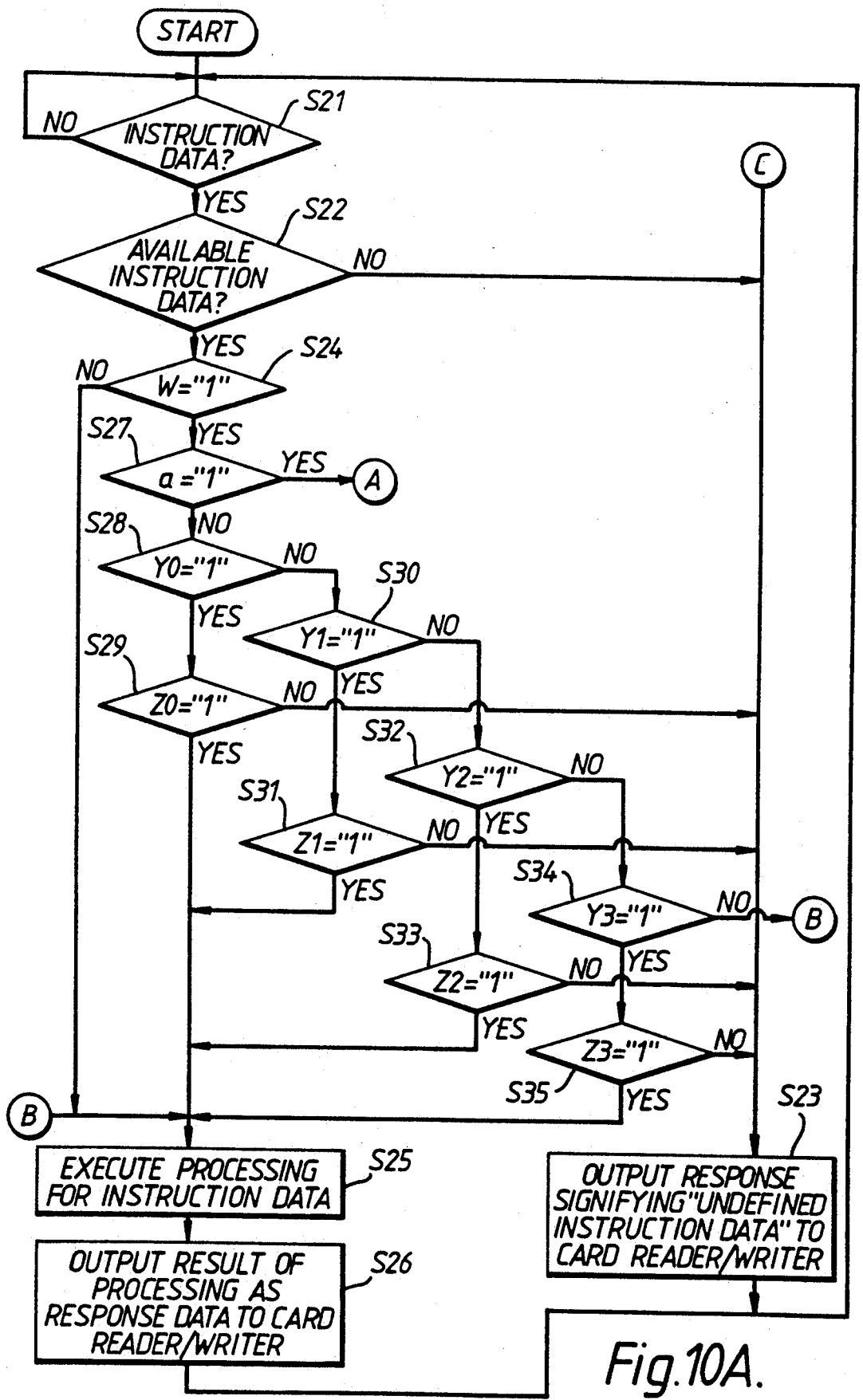
FIGS. 10A and 10B are flow-charts illustrating the processing operation.

The processing operation based on the instruction data will now be explained with reference to the flow-charts shown in FIGS. 10A and 10B. In the regular state, IC card 1 is in the ready state for instruction data from card reader/writer 2. In this state, when instruction data from card reader/writer 2 is inputted (step S21), CPU 11 determines whether or not this is available instruction data (step S22). If it is not available instruction data, CPU 11 outputs the response data signifying 'undefined instruction data' to card reader/writer 2 (step S23). CPU 11 then returns to the ready for instruction data state. If the data is available instruction data, CPU 11 locates the function code attributed to the instruction data from AREA [01] of data memory 12. CPU 11 then refers to the identifier W of the stored control information corresponding to that function code and determines whether W is a "1" or not (step S24). If identifier W is not a "1", checking of identifiers Y0-Y3 is not required (i.e., ID number verification is not required). Thus, CPU 11 begins processing according to by a functional program corresponding to the relevant instruction data (step S25). In other words, CPU 11 recognizes the lead address of the functional program stored corresponding to the function code found from AREA [01] of data memory 12 and steps to that functional program. Processing then occurs according to that functional program. The processing result is then outputted to card reader/writer 2 as response data (step S26). Finally, CPU 11 returns to the ready for instruction data state.

If identifier W is a "1" and the corresponding identifier $\alpha$ is not a "1" (step S27), CPU 11 refers to the corresponding control data identifier Y0 (step S28). If identifier Y0 is a "1", CPU 11 refers to identifier Z0 of the data representing the result of the ID number verification (step S29), and determines whether this is a "1" or not. If Z0 is a "1", ID number verification has already been executed, and a verification agreed result has been obtained. In step S29, if Z0 is not a "1", since a verification agreed result has not been obtained, the response data signifying 'undefined instruction data' is outputted (step S23). CPU 11 then enters the ready for instruction data state.

In step S28, if identifier Y0 is not a "1", CPU 11 refers to control data identifier Y1 (step S30). If this is a "1", CPU 11 refers to identifier Z1 representing the result of the ID number verification and determines whether this is a "1" or not (step S31). If Z1 is a "1", ID number verification has already been executed and a verification agreed result has been obtained. If Z1 is not a "1", since a verification agreed result has not been obtained, the response data signifying 'undefined instruction data' is outputted (step S23). CPU 11 then enters the ready for instruction data state.

In step S30, if Y1 is not "1", CPU 11 refers to control data identifier Y2 (step S32). If this is a "1", CPU 11 refers to identifier Z2 and determines whether this is "1", or not (step S33). If Z2 is a "1", ID number verification has already been executed and a verification agreed result has been obtained. If Z2 is not a "1", since a verification agreed result has not been obtained, the response data signifying 'undefined instruction data' is outputted (step S23). CPU 11 then enters the ready for instruction data state.

In step S32, if Y2 is not a "1", CPU 11 refers to control data identifier Y3 (step S34). If this is a "1", CPU 11 refers to identifier Z3 and determines whether this is "1", or not (step S35). If Z3 is a "1", ID number verification has already been executed and a verification agreed result has been obtained. If Z3 is not a "1", since a verification agreed result has not been obtained, the response data signifying 'undefined instruction data' is outputted (step S23). CPU 11 then enters the ready for instruction data state.

In step S34, if Y3 is not a "1", the flow proceeds to step S25 because ID number verification is not required. In other words, CPU 11 then processes according to the functional program that corresponds to the relevant instruction data (step S25).

Figure 10B:
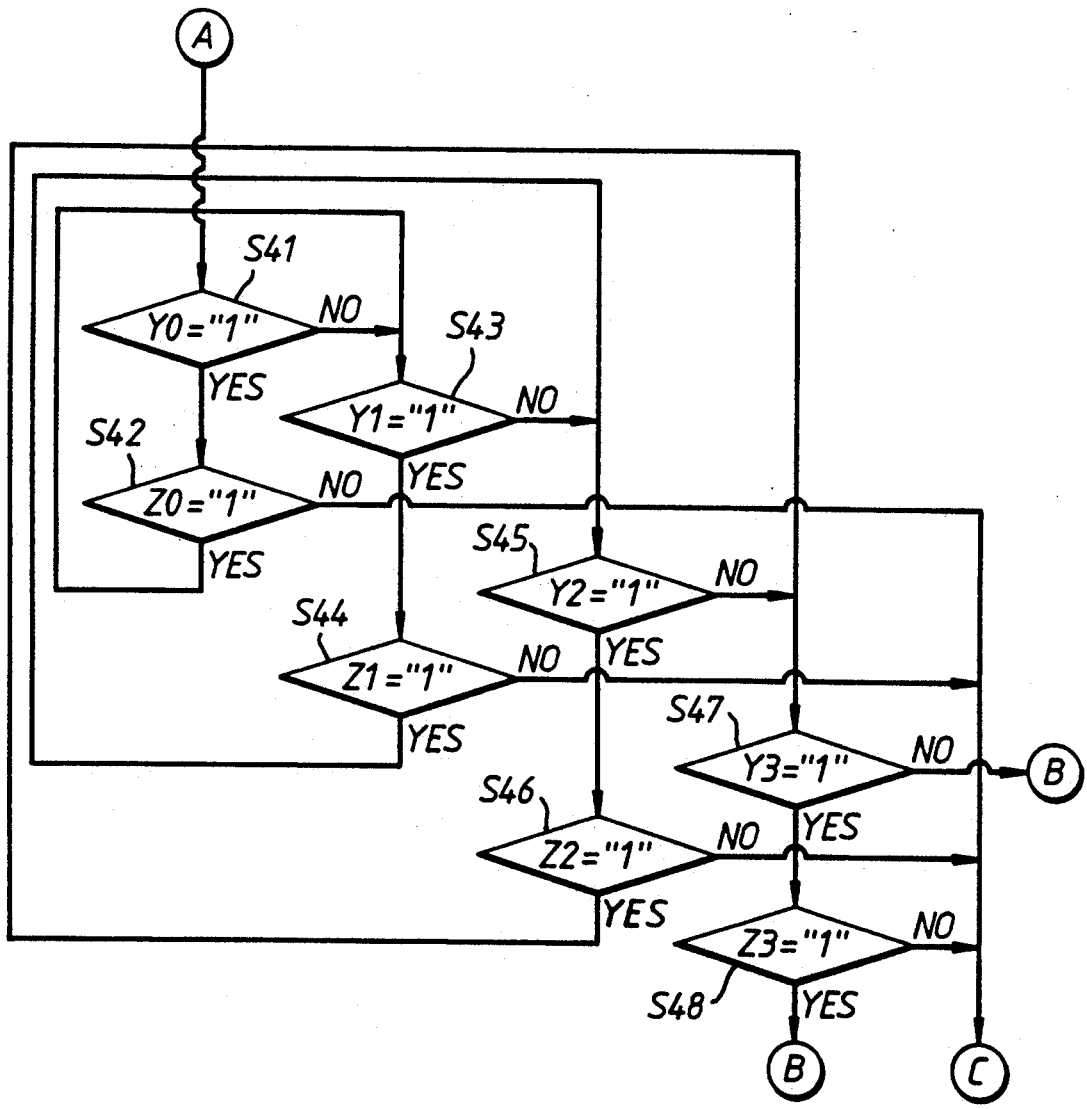

In step S27, if identifier $\alpha$ is a "1", as shown in FIG. 10B, CPU 11 refers to the corresponding control data identifiers Y0-Y3 (steps S41, S43, S45 and S47) and finds an identifier which is a "1". If CPU 11 finds an identifier (Y0-Y3) which is a "1", it refers to the corresponding identifier (Z0-Z3) of the information representing the result of ID number verification. CPU 11 then determines whether it is a "1", or not (steps S42, S44, S46 and S48). If each of the corresponding Z0-Z3 is "1", ID number verification has already been executed and a 'verification agreed' result has been obtained. Therefore, CPU 11 begins processing according to functional program corresponding to the relevant instruction data as described above. If one of the corresponding Z0-Z3 is not "1", either ID number verification has not been executed or, even if ID number verification has been executed, a 'verification disagreed' result has been obtained. Therefore, CPU 11 does not begin processing, and outputs the response data signifying 'undefined instruction data' to card reader/writer 2. CPU 11 then returns to the ready for instruction data state.

As described above, whether or not ID number verification is required for response to the available instruction data is set within the control data. Thus, a key is applied to the available instruction data by setting the ID number verification state for the card-manufacturer, the card-issuer and the card-holder. Processing of the instruction data can be selectively executed by determining whether or not the ID number verification result has responded to the instruction data. Moreover, in the case of unavailable instruction data or if the ID number verification results are negative, the response data signifying 'undefined instruction data' is outputted externally. By this means, available instruction data does become easily identified through the response data. Moreover, security is further improved by determining the combination of the verification results of the card-manufacturer's, card-issuer's and card-holder's IDs.

In the above embodiment, an IC card has been used as an example of a portable electronic device. However, the present invention is not limited to card-shaped device. For example, the invention may be applied to a block-shaped or a pencil-shaped devices. Accordingly, it should be understood that the portable electronic device can be changed or modified without departing from the scope of the present invention.

What is claimed is:

1. A portable electronic device comprising:
   first memory means for storing a plurality of identification number data;
   means for receiving a plurality of instruction data including an identification number verifying instruction data and identification number data from an external device;
   means for verifying the identification number data received by the receiving means with the identification number data stored in the first memory means when the receiving means receives identification number data and identification number verifying instruction data;
   second memory means for storing verification results;
   third memory means for storing control data corresponding to the instruction data and representing a plurality of identifiers each indicating whether or not identification number verification is required and further indicating whether complete or partial identification number verification is required;
   first means for referring to the partial verification results stored in the second memory means when the control data stored in the third memory means indicates the partial identification number is required after instruction data other than identification number verifying instruction data has been received by the receiving means; and second means for referring to the complete verification results stored in the second memory means when the control data stored in the third memory means indicates the complete identification number verification is required; and means for executing the instruction data in response to the results of the first and second referring means and the control data.

2. The device of claim 1, wherein the identifiers includes first identifiers (Y0–Y3) designating the identification number data which should be verified from among the identification number data, and a second identifier (α) indicating whether complete or partial identification number verification of the identification number data designated by the first identifiers (Y0–Y3) is required.

3. The device of claim 2, wherein the referring means refers to the verification results of the identification number data which should be verified.

4. The device of claim 1, wherein the first, second and third memory means are contained in one data memory element.

5. The device of claim 1, wherein the means for referring and means for verifying are a CPU contained in a portable electronic device.

6. A method for processing data by a portable electronic device with a memory having first to third memory areas, the method comprising the steps of:

storing a plurality of identification number data in a first memory area;

receiving identification number data from an external device;

verifying the identification number data received in the receiving step with the identification number data stored in the first memory area;

storing verification results in a second memory area;

receiving instruction data from an external device;

storing, in a third memory area, control data corresponding to the instruction data and representing a plurality of identifiers each indicating whether or not identification number verification is required and further indicating whether complete or partial identification number verification is required;

referring to the verification results stored in the second memory area in accordance with the control data stored in the third memory area after the instruction data has been received; and executing the instruction data in response to the verification results and the control data.

7. A method for processing data by a portable electronic device with a memory having first to third memory areas, the method comprising the steps of:

storing a plurality of identification number data in a first memory area;

receiving identification number data and identification number verifying instruction data;

verifying the identification number data received in the receiving step with the identification number data stored in the first memory area when identification number data and identification number verifying instruction data has been received;

storing verification results in a second memory area for every identification number verifying instruction data received;

receiving instruction data other than identification number verifying instruction data;

storing, in a third memory area, a first identifier (W) indicating whether identification number verification is required which corresponds to each of the instruction data other than identification number verifying instruction data, second identifiers (Y0–Y3) designating which identification number data should be verified from among the plurality of identification number data stored in the first memory area, and a third identifier (α) indicating whether complete or partial identification number verification of the identification number data designated by the second identifiers (Y0–Y3) is required;

referring to the verification results of the identification number data which should be verified when identification number verification is required based on the first to third identifiers stored in the third memory area after instruction data other than identification number verifying instruction data has been received; and executing the instruction data other than identification number verifying instruction data only after identification number data has been verified in the referring step.

* * * * *